July 17, 1923.
C. L. BASTIAN
SIRUP JAR
Filed Feb. 3, 1919
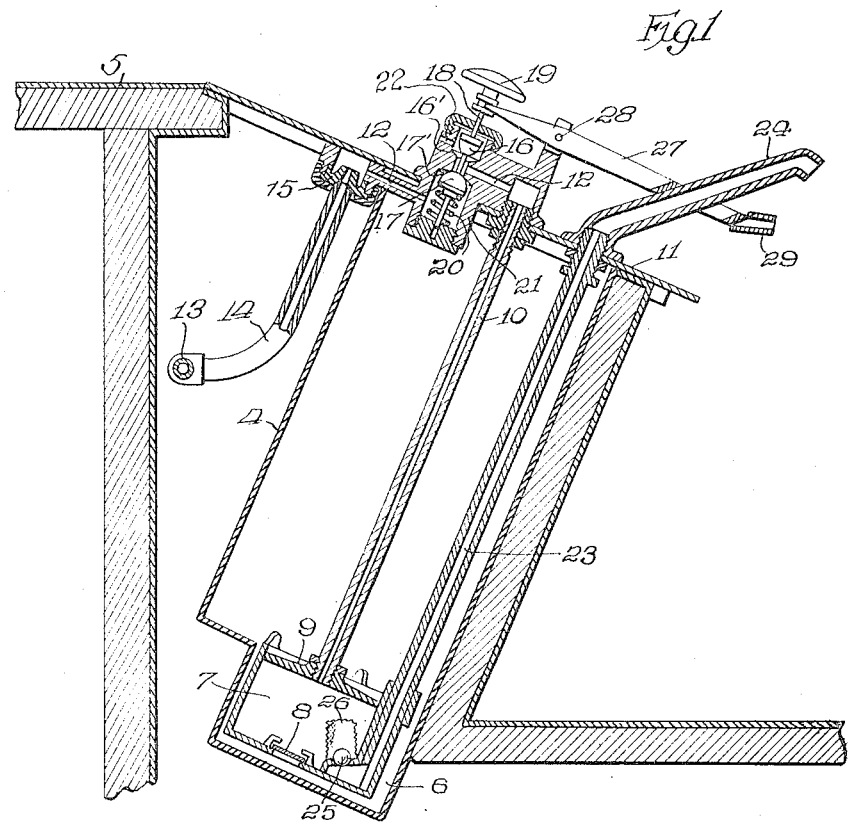
Fig. 1
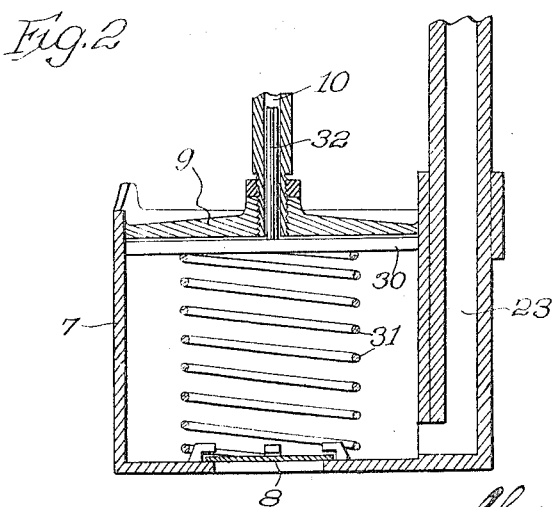
Fig. 2
Inventor
Charles L. Bastian Patented July 17, 1923.

1,461,960

UNITED STATES PATENT OFFICE.

CHARLES L. BASTIAN, OF CHICAGO, ILLINOIS, ASSIGNOR TO THE BASTIAN-BLESSING COMPANY, OF CHICAGO, ILLINOIS, A CORPORATION OF ILLINOIS.

SIRUP JAR.

Application filed February 3, 1919. Serial No. 274,629.

*To all whom it may concern:*

Be it known that I, CHARLES L. BASTIAN, a citizen of the United States, residing at Chicago, in the county of Cook and State of Illinois, have invented certain new and useful Improvements in Sirup Jars, of which the following is a specification.

This invention relates to soda fountain apparatus of the kind referred to in my application Serial No. 89,291 filed April 6, 1916, and to improvements upon the sirup pump delivery disclosed in said application.

The object of the invention is to provide for a quick discharge of sirup in a measured quantity from a sirup jar by air pressure which may be obtained from the top of the tank of the carbonating machine or from any other source of supply.

The invention also has for its object the provision of simple and novel means for utilizing air pressure from the carbonating machine or other source of supply to deliver the sirup in measured quantities from the sirup jars.

In the accompanying drawings—

Fig. 1 is a sectional view illustrating my invention embodied in a tilted sirup jar;

Fig. 2 is an enlarged sectional view of a measuring chamber provided with a spring-pressed plunger.

Referring to the drawings, the sirup jar 4 is supported in any suitable manner in the counter 5 and is preferably provided with a well or recess 6. A charge chamber 7 is arranged in the well or recess and is provided with an inlet valve 8 in its bottom and a closed top 9. A pipe 10 is connected at one end with the top of the measuring chamber and at its other end to the top 11 of the jar where it communicates with a valved passage 12 through which pressure enters the charge chamber from the source of supply.

The pressure may be delivered to the counter adjacent to the sirup jars through a main pipe 13 provided with a branch 14 for each jar, there being a suitable socket 15 on the sirup jar to automatically engage and make tight connection with the end of the branch pipe 14 when the jar is inserted in its proper place in the counter. The valve in the passage 12 which connects the pressure supply with the charge chamber pipe 10 has an upper disk 16 and a lower disk 17 mounted on the stem 18 which is provided with a head 19. A spring 20 in the valve casing 21 normally holds the disk 17 against its seat 17' to shut off the air pressure from the charge chamber. In the closed position of disk 17, the disk 16 is unseated so that any air pressure in the charge chamber may escape through the openings 22 and permit the chamber to fill with sirup. When disk 16 is pressed to its seat 16' disk 17 will be unseated and pressure may then flow from the supply through passage 12 and pipe 10 into the charge chamber 7. This pressure will force sirup from the chamber through the passage 23 and the nozzle 24 to a glass held beneath the nozzle, and in every instance a measured quantity of sirup will thus be delivered.

The passage 23 is provided with a valve, preferably at its inlet from the charge member, to prevent the discharge of air or gas from the nozzle after delivery of the measured quantity of sirup. This valve is preferably in the form of a cork ball 25 arranged within a foraminous cage 26, but any other suitable form of valve may be employed as desired.

Provision is made for operating the valve stem 18 by the glass which is to receive the sirup charge. A lever 27 is pivotally mounted at 28 on the sirup jar and has one end arranged in engagement with the stem 18. The other end of the lever is preferably provided with a rubber covering 29 and is arranged in a position to be engaged by the glass when it is positioned with respect to the nozzle to receive the sirup charge. The glass is employed to swing the lever on its pivot and operate the pressure valve as hereinbefore described.

A plunger 30 may be arranged in the charge chamber, if desired, as shown in Fig. 2. This plunger is normally pressed by a spring 31 against the top of the charge chamber and it is guided by a stem 32 which operates in the pipe 10. The plunger is intended to fit snugly within the chamber and prevent the pressure from escaping from the chamber into the delivery pipe 23, in this respect taking the place of the ball valve of the construction shown in Fig. 1.

My invention provides a very simple means for utilizing air or gas pressure to effect the delivery of a measured charge of sirup from the sirup jar without the escape of pressure from the discharge nozzle. The pump mechanism does not embody any complicated parts and since the pressure may be taken from the top of the carbonating tank the cost of operating is reduced to a minimum.

I am aware that changes in the form and proportion of parts and details of construction may be made without departing from the spirit or sacrificing the advantages of the invention and I therefore reserve the right to make all such changes as fairly fall within the scope of the following claims.

I claim:

1. In a liquid dispensing apparatus, a counter or the like, a pipe associated with the counter or the like for supplying fluid under pressure, a jar supported by the counter or the like and detachable with respect thereto, means in the jar for measuring a charge of liquid of pre-determined volume, a discharge nozzle carried by the jar, a passage in the jar connecting the measuring means with the discharge nozzle, a second passage in the jar associated with the measuring means, valve means carried by the jar for controlling the second passage, and means for detachably connecting the second passage to the pipe.

2. In a liquid-dispensing apparatus, a jar, a measuring chamber within said jar, a discharge connected with said chamber and terminating in a nozzle, a pipe connected with the top of said chamber, a valve controlling the flow of pressure to and from said pipe, a pivoted lever operatively connected with said valve and having an arm adjacent to said discharge nozzle to be engaged and controlled by a receptacle into which the liquid is dispensed.

3. In a liquid dispensing apparatus, a pipe for supplying fluid under pressure, a jar, an inlet associated with the jar, quick detachable means for connecting the inlet to the pipe, a measuring chamber in the jar, an inlet valve for the chamber, an outlet valve for the chamber, a passage connecting the chamber to the inlet, a valve for controlling the passage, a discharge nozzle carried by the jar, and a second passage for connecting the outlet valve to the discharge nozzle.

4. In a liquid dispensing apparatus, a pipe for supplying fluid under pressure, a jar, an inlet associated with the jar, quick detachable means for connecting the inlet to the pipe, a measuring chamber in the jar, an inlet valve for the chamber, an outlet valve for the chamber, a passage connecting the chamber to the inlet and to the atmosphere, a double acting valve controlling the passage, a discharge nozzle carried by the jar, and a second passage for connecting the outlet valve with the discharge nozzle.

5. The combination with a source of fluid under pressure, of means for dispensing liquid, comprising a container for the liquid, a measuring chamber in the container, an inlet valve in the wall of the chamber, an outlet valve in the wall of the chamber, a second inlet valve carried by the container, a passage connecting the second inlet valve with the chamber, the second passage communicating with the second inlet valve, quick detachable means for connecting the second passage to the source of fluid under pressure, a discharge carried by the container, and a third passage connecting the outlet valve to the discharge.

6. In a liquid dispensing apparatus, a source of fluid under pressure, a jar for holding a supply of liquid, means for measuring a charge of the liquid of predetermined volume, a discharge nozzle carried by the jar, a passage in the jar connecting the measuring means with the discharge nozzle, a second passage in the jar, valve means carried by the jar for controlling the second passage, and quick detachable means for connecting the second passage to the source of fluid under pressure.

7. In a liquid dispensing apparatus, a counter or the like, a pipe associated with the counter or the like for supplying fluid under pressure, a jar supported by the counter or the like and detached with respect thereto, means in the jar for measuring a charge of liquid of predetermined volume, a discharge nozzle carried by the jar and connected to the measuring means, means carried by the jar for controlling the measuring means, and quick detachable means for connecting the measuring means with the pipe.

CHARLES L. BASTIAN.